(No Model.)

W. W. GREENWOOD.
PNEUMATIC TIRE.

No. 503,594. Patented Aug. 22, 1893.

WITNESSES:
Thos S Combs
James A Parker

Williston W. Greenwood,
INVENTOR.

UNITED STATES PATENT OFFICE.

WILLISTON W. GREENWOOD, OF NEW YORK, N. Y.

PNEUMATIC TIRE.

SPECIFICATION forming part of Letters Patent No. 503,594, dated August 22, 1893.

Application filed April 7, 1893. Serial No. 469,487. (No model.)

*To all whom it may concern:*

Be it known that I, WILLISTON W. GREENWOOD, a citizen of the United States, residing at New York, in the county of New York and State of New York, have invented a new and useful Improvement in Pneumatic Tires, of which the following is a specification.

My invention relates to a means to be employed to confine the air under pressure in a pneumatic tire and to fasten said tire to the rim of its wheel; said means being designed to afford a secure and durable fastening of simple construction, and at the same time to admit of quick access to the rim of the wheel and to the interior of the tube containing the air for the purpose of repairs, and to admit also of the quick adjustment of the tire after such repairs are effected. I attain these objects by the construction shown in the accompanying drawings, in which—

Figure 1:
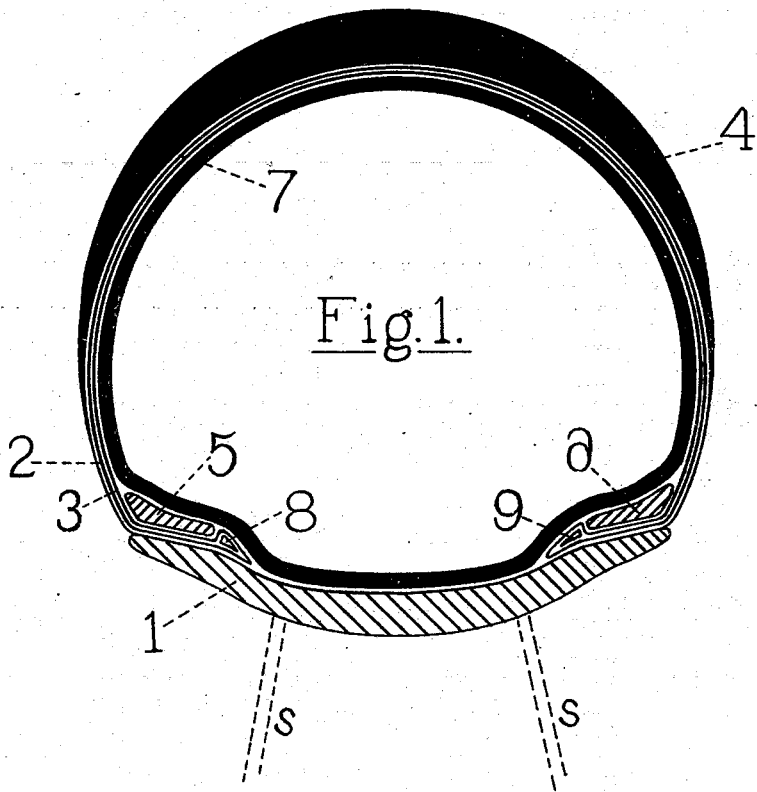
Figure 2:
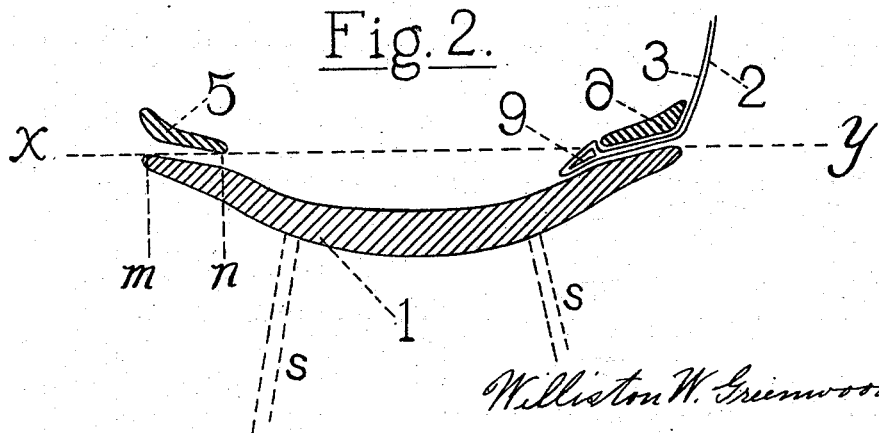

Figure 1. is a transverse section of a rim and tire cut by a plane which contains the axis (axle) of the wheel. Fig. 2. shows a portion of the same section as that shown by Fig. 1.

In the drawings the hatched portion designated by the numeral 1 shows in section the supporting rim of the wheel. The position of the spokes is shown by dotted lines marked *s s*. Outside of the supporting rim (1) and lying upon it is an air tight tube of rubber which is shown in solid black of even thickness and is designated by the numeral 7. This tube will be herein spoken of as "the inner tube." The office of the inner tube is simply to supply an elastic, closed tube which shall extend around the supporting rim and be as nearly as possible impervious to air. Said inner tube is supplied with a valve by means of which air may be pumped into it and so make the air within the tube dense enough to support the weight desired. The valve should also be capable of deflating the tube. This valve is not shown in the drawings as my improvement has to do neither with this inner tube nor its valve. This inner tube of rubber is not at all adapted to confine the air to a definite volume as it would expand under the pressure of the air within until it burst. It is therefore necessary to use as nearly as possible an inextensible, and, at the same time, flexible, material with which to inclose this air-tight rubber tube and thus to confine the air under pressure within it to a definite volume; the material usually employed for this purpose is stout canvas. In the drawings a double covering of such material is shown by the double line outside the inner tube, the inner covering (next the inner tube) being designated by the numeral 3, and the outer one by the numeral 2. These coverings will be herein spoken of as the "canvas coverings," because usually made of canvas. It will be seen by inspection of the drawings that the canvas coverings do not entirely inclose the inner tube, the gap being closed by the rim. The edges of the canvas coverings are enlarged into the portions indicated by numerals 8 and 9. These edges of the canvas coverings are clamped firmly to the rim by means of bands of rigid material extending around the rim and shown in section by the hatched portions designated by numerals 5 and 6. The enlargements at the edges (8 and 9) serve to bring the canvas to the proper position to secure a tube of uniform size all around the wheel, and also serve to preclude any possibility of the canvas pulling through between the clamping strips and the rim. The canvas coverings should be protected from wear and water, and the inner tube should likewise be protected from puncture, by an outer protection covering of rubber designated by the numeral 4, and shown in solid black. This protection covering is made thick at the tread to protect from wear and puncture, and only thick enough at the sides and near the rim to serve as protection against water. The protection covering should be as thin as possible at the sides in order to leave the tire as flexible at these points as possible and also to save weight.

The fastening and adjustment of the tire as shown in Figs. 1 and 2 is as follows: Beginning with the bare rim (1), the band of rigid material (6) is first slipped upon the rim. The bands 5 and 6 are made of such a circumference that they will barely slip over the edge of the rim. This is shown in Fig. 2, where the point *m* of greatest diameter of the rim is shown at the same distance from the axis of the wheel as the point *n* of least diameter of the band 5, both points being on the horizontal line *x—y*. The band 6 being brought to the center of the rim there is room between the band and the rim for the insertion of the edge of the canvas coverings. It is not essential that these bands should be of sufficient circumference to slip over the rim of wheel inasmuch as said bands could be made of less circumference and effect the clamping in the same manner and by virtue of the same principle as herein set forth; in which case—i. e., of the smaller bands—said bands could be made with one or more joints to admit of being taken from the rim if so desired. After the covering has been thrust between the rim and the band all around the wheel it may then be pulled toward the edge of the rim, thus drawing, by means of the enlargement 9, the band 6 with it. When drawn to the edge of rim the canvas is firmly clamped between the band and the rim and the more tension there is in the canvas the firmer is it held by virtue of the increased diameter of the rim at its edge. This coning of the rim is plainly shown under the horizontal line $x-y$ in Fig. 2. When in position at the edge of the rim, and with one canvas edge underneath it, the band is then fastened so that it cannot move back toward the center of the rim and so liberate the canvas while the other edge is being adjusted. The band first put in place (in this description the band 6) may be prevented from moving toward the center by means of two screws at opposite points on the inside of the band, or by a spring which, when the band has passed over it, rises and prevents the band from moving toward the center of rim and freeing the canvas. The means of thus holding the band first put on is not shown in the drawings. It should be remembered that this is needed only while the other edge is being fastened for when the tire is inflated neither of the bands can have a tendency to move toward the center of the rim. Next place in position the inner tube 7 and pump just sufficient air into it to cause it to assume the size that it should have when the tire is fully inflated. Then slip over the edge of the rim the other continuous clamping band 5. The wheel being now turned upon its side with this edge uppermost the last band put on will be lightly supported by the partially inflated inner tube. Then fold the canvas coverings over the inner tube and thrust the other edge of same (edge 8) between the band 5 and the rim 1. Turning the wheel the other side up, the band will fall over the thickened edge 8 and on further inflating the tire it will be drawn snugly and tightly into position. The desired density of confined air being secured, the tire is ready for service. This describes the entire operation of putting the tire on the rim. When it is desired to expose the inner tube to repair a puncture, or to expose the rim for any purpose, it is necessary to remove only the loose band (the one last put on).

The operation is performed as follows: Deflate the tire, press the band 5 toward the center of the rim, pull out the edge of the canvas covering which is thus liberated and fold the whole outer covering back over the inner tube thus exposing it completely. The latter part of the description already given for adjusting the tire applies to replacing after repairs are completed. The enlarged edge of the canvas coverings may be formed by simply doubling the canvas over itself at its edge, or it may be formed by inclosing a more rigid material within the canvas.

I am aware that a continuous wire has been employed in fastening a tire to its rim, but the principle of fastening with the wire as used by others is not the same as in my fastening. The wire as used in other fastenings does not clamp the edge of the canvas to the rim, but it is itself incased in the canvas and is prevented from slipping over the rim (when the tire is inflated) only by being made of less circumference than the outer edge of the rim. Whereas, in my fastening the bands fasten the tire by clamping the canvas casing between themselves and the rim by virtue of the increased diameter of the edges of said rim, toward which edges said bands are forcibly drawn by virtue of the tension in the canvas casing, induced by the pressure of the air confined; and said bands may also be of a slightly greater diameter than the greatest diameter of the rim. Moreover, the bands used in my fastening are valuable in adding strength to the supporting rim, being held tightly against it throughout their entire circumference and acting in concert with the rim to resist any blow or strain upon the same, and therefore addition of weight need not be incurred by their use, as the same rigidity of rim may be obtained by use of the clamping bands in combination with a rim made correspondingly lighter.

Another advantage that the clamping bands possess is that the tire is firmly clamped to the rim at all points so that slipping or creeping of the tire around the rim is impossible. This slipping of the tire on the rim has proven an objectionable feature of other tires and is an important consideration.

I am further aware that a device has been employed to fasten a pneumatic tire to the rim of its wheel, which device consists of a band of metal drawn over the edge of the tire and outside of the rim, the clamping being effected (not as in my improvement by a continuous band and coning of the outer edge of the rim) by means of screws or levers, the bands being non-continuous and the two ends being brought together and tightened by means of the screw and lever device. In this case the greater the strain of the confined air in the tire, the less secure is the clamping of the tire to the rim, and it is furthermore exposed to accident, being at the outside edge of the rim and unprotected by the tire.

In my device the bands are continuous, no mechanism of screws or levers to effect the clamping is employed, the bands are not exposed (being within the tire), and the greater the pressure exerted by the confined air within the tire, the greater is the firmness with which the covering is clamped to the rim because the clamping depends on the increased diameter of the rim at its outer edge and the stress of the compressed air induced in the canvas always tends to pull the bands out where the diameter of the rim is larger.

I claim as my invention and desire to secure by Letters Patent the following:

In combination with a wheel rim of rigid material supporting thereon an inner tube impervious to air, said inner tube being confined by an inextensible, flexible covering,—clamping devices consisting of continuous, or jointed inextensible, longitudinal bands or hoops of rigid material, which bands effect the clamping of the edges of said inextensible, flexible covering between themselves and said wheel rim by means of the increasing diameter of said rim at its outer edges, the bands being held to their positions against the coned rim on the side away from the axle of said wheel by the tension existing in the covering and induced by virtue of the compressed air within the inner tube, the edges of said inextensible, flexible covering being furthermore prevented from slipping through by enlarged borders; substantially as shown and described in the accompanying specification.

WILLISTON W. GREENWOOD.

Witnesses:
THOS. S. COMBS,
BENJ. L. BRANDNER.